United States Patent
Ito et al.

(10) Patent No.: US 6,238,073 B1
(45) Date of Patent: May 29, 2001

(54) VEHICLE SIGNAL LIGHTING UNIT

(75) Inventors: Hiroyuki Ito; Takeaki Okamura, both of Tokyo (JP)

(73) Assignee: Stanley Electric Co., Ltd. (JP)

( * ) Notice: Subject to any disclaimer, the term of this patent is extended or adjusted under 35 U.S.C. 154(b) by 0 days.

(21) Appl. No.: 09/266,152

(22) Filed: Mar. 10, 1999

(30) Foreign Application Priority Data

Mar. 13, 1998 (JP) .................................................. 10-063246

(51) Int. Cl.[7] ...................................................... F21V 29/00
(52) U.S. Cl. ........................ 362/544; 362/236; 362/241; 362/545
(58) Field of Search ................................... 362/585, 544, 362/543, 235, 236, 241, 508

(56) References Cited

U.S. PATENT DOCUMENTS

| | | | | |
|---|---|---|---|---|
| 1,950,083 | * | 3/1934 | Gramt ................................... | 362/508 |
| 5,136,483 | * | 8/1992 | Schuniger et al. ...................... | 362/61 |
| 5,924,785 | * | 7/1999 | Zhang et al. .......................... | 362/241 |

* cited by examiner

*Primary Examiner*—Stephen Husar
*Assistant Examiner*—John Anthony Ward
(74) *Attorney, Agent, or Firm*—Ostrolenk, Faber, Gerb & Soffen, LLP

(57) ABSTRACT

A vehicle signal lighting unit includes a light source, a plain outer lens, and a composite reflecting mirror consisting of a unit reflecting surface which reflects light having desired light distribution characteristics from the light source. The light source emits no direct light in an illuminating direction of the vehicle signal lighting unit, and is positioned to allow incident light against said composite reflecting mirror from at least two directions, and to prevent direct observation of the light source itself through the outer lens. Each unit reflecting surface of said composite reflecting mirror includes reflecting surface which reflects light from the light source from said two directions. Since the light source is provided outside an effective luminescent surface, the light source cannot be observed directly from outside through the plain outer lens. The light source can be mounted on both ends of the lighting unit outside an effective luminescent surface. The outer lens side of the light source can be provided with a hood member for preventing observation of the light source itself.

12 Claims, 3 Drawing Sheets

VEHICLE SIGNAL LIGHTING UNIT

BACKGROUND OF THE INVENTION

1. Field of the Invention

The present invention relates to a vehicle signal lighting unit for a stop lamp, tail lamp, turn signal lamps, or the like, and more particularly to a signal lighting unit in which a sufficient depth effect and improved design can be attained by providing desired light distribution characteristics with a reflecting mirror and forming an outer lens to be almost plain.

2. Background Art

FIG. 7 shows a configuration of a similar vehicle signal lighting unit 90 based on the prior art. The vehicle signal lighting unit 90 is provided with a single light source 91 such as a filament lamp and a composite reflecting mirror 92 in which each reflecting unit 92a reflects incident light from the light source 91 horizontally and vertically to provide a proper diffusion angle. The vehicle signal lighting unit 90 is formed so that the composite reflecting mirror 92 itself provides the desired light distribution characteristics.

Accordingly, an outer lens 93 can be almost plain without any lens cut and needs not have any means for providing required light distribution characteristics. Therefore, the inside of the vehicle signal lighting unit 90 is visible through the outer lens 93 independently of whether the vehicle signal lighting unit is turned on or off. Because of this, a depth effect increases and a high-quality design is available.

When observers look into the above-mentioned vehicle signal lighting unit 90 through said outer lens 93, however, there arises such a problem that said light source 91 and a socket 91a therefor are almost directly exposed to observers, degrading aesthetics. Especially when the vehicle signal lighting unit is turned on, direct light from a high-luminance filament reaches observer's eyes. Accordingly, there is also a problem that a large contrast between light and shade on a luminescent surface decreases the visibility.

To solve the aforementioned problems, there is provided another configuration, as shown in FIG. 7, having a hood 94 provided with a lens cut 94a to diffuse the direct light. When the vehicle signal lighting unit is viewed obliquely, however, the socket 91a and other components are still exposed to observers. While the filament shape becomes unidentifiable when the light is turned on, however, there still remains a problem that the front of the hood 94 becomes too bright, causing a greater contrast between light and shade than the other locations.

SUMMARY OF THE INVENTION

It is an object of the present invention to provide a vehicle signal lighting unit which allows uniform brightness on a luminescent surface by use of only light reflected on a composite reflecting mirror in which direct light from the light source is excluded when the vehicle signal lighting unit is turned on.

It is further object of the present invention to provide a vehicle signal lighting unit which prevents observers from directly viewing internal components such as a light source when the vehicle signal lighting unit is turned off and allows a simplified design, thereby improving aesthetics of similar vehicle signal lighting units.

The present invention, to attain said objects, provides a vehicle signal lighting unit comprising a light source, a plain outer lens, and a composite reflecting mirror including unit reflecting surfaces which reflect light having desired light distribution characteristics from said light source, in which the light source emits no direct light in the illuminating direction of the vehicle signal lighting unit and is positioned to allow incident light from at least two directions against said composite reflecting mirror and to prevent direct observation of the light source itself through the outer lens, and in which each unit reflecting surface of the composite reflecting mirror comprises reflecting surfaces to reflect light from the light source in said two directions.

The present invention also provides a vehicle signal lighting unit characterized in that the above-mentioned light source is provided outside an effective luminescent surface of the vehicle signal lighting unit.

Further, the present invention provides a vehicle signal lighting unit characterized in that the light source is provided on both ends of the vehicle signal lighting unit.

Moreover, the present invention provides a vehicle signal lighting unit equipped with a hood member on the outer lens side of said light source for preventing observation of the light source itself.

Furthermore, the present invention provides a vehicle signal lighting unit in which a reflex reflector is provided in the vicinity of said outer lens and said light source is provided on the rear thereof.

DETAILED DESCRIPTION OF THE PREFERRED EMBODIMENTS

Figure 1:
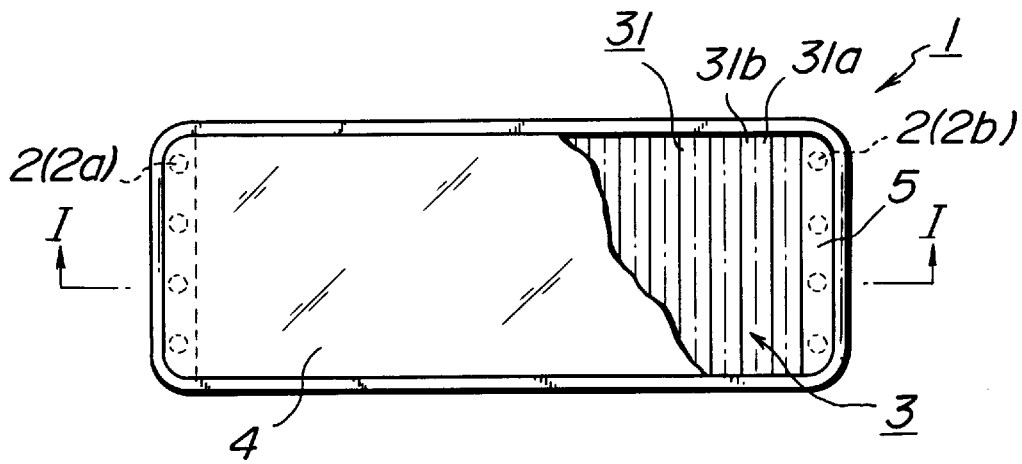
FIG. 1 is a partially sectioned front view of an embodiment of the vehicle signal lighting unit according to the present invention.
Figure 2:
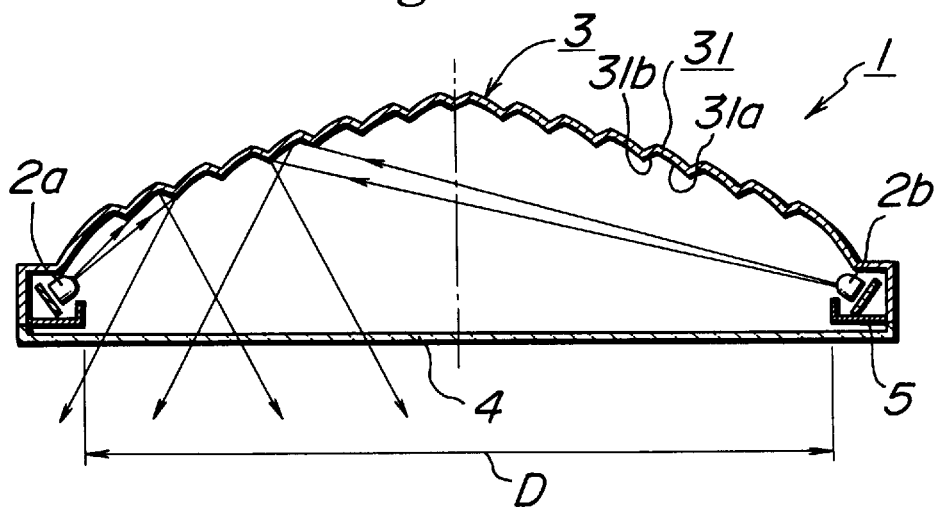
FIG. 2 is a cross-sectional view taken in the line I—I of FIG. 1.

The following detailed description explains the present invention based on the embodiments showed in the accompanying drawings. In FIGS. 1 and 2, the numeral 1 indicates a vehicle signal lighting unit according to the present invention. The vehicle signal lighting unit 1 comprises a light source 2a, 2b a composite reflecting mirror 3, and an outer lens 4. The outer lens 4 can be almost plain similar to the embodiment according to the prior art.

In the present invention, said light source 2a, 2b is provided outside an effective luminescent surface D of the vehicle signal lighting unit 1. Said light source 2a, 2b is provided with a hood member 5, preventing the light source 2a, 2b from radiating a direct light in the illuminating direction of the vehicle signal lighting unit 1. Said hood member 5 also prevents the light source 2a, 2b being directly observed through the outer lens 4.

In addition, the present invention provides said light source 2a, 2b at two locations. In this embodiment, the light source 2a, 2b is provided as a light source 2a and a light source 2b on each end of the vehicle signal lighting unit 1 in the horizontal direction. Light sources 2a, 2b are disposed so that an optical axis of light sources 2a, 2b is aimed toward composite reflecting mirror 3. However, the present invention does not limit installation locations of the light source to the horizontal direction. For example, the light source can be installed on two locations in the vertical direction of the vehicle signal lighting unit.

As shown in FIG. 1, the present invention can also be implemented by vertically arranging a plurality of said light sources 2a or light sources 2b on each end of the vehicle signal lighting unit 1 along the horizontal direction. Namely, as described later, any configuration is available as long as an incident light is available from two directions against the composite reflecting mirror 3. The light sources 2a and 2b can be filament lamps, LEDs, or neon tube lamps of any kind and in any combination thereof.

In the present invention, said composite reflecting mirror 3 is so shaped as to correspond to the light sources 2a and 2b mounted on the above-mentioned two locations. In other words, the composite reflecting mirror 3 has a composite structure of a unit reflecting surface 31. The unit reflecting surface 31 is a combination of a reflecting surface 31a for reflecting light from the light source 2a and a reflecting surface 31b for reflecting light from the light source 2b.

As far as each unit reflecting surface 31 is concerned, the reflecting surface 31a reflects light from the light source 2a and the reflecting surface 31b reflects light from the light source 2b within a range of light distribution characteristics desired for vehicle signal lighting unit 1. Consequently, reflected light from the composite reflecting mirror 3, which is a composite structure of the unit reflecting surfaces 31, also satisfies the light distribution characteristics for the vehicle signal lighting unit 1.

In the above-mentioned embodiment, the light source 2 (2b, 2a) is provided on both ends of the vehicle signal lighting unit 1 along the horizontal direction, and the composite reflecting mirror 3 is vertically divided by means of the unit reflecting surfaces 31. However, the present invention is not limited to this configuration. For example, the light source 2 can be mounted on both ends of the vehicle signal lighting unit 1 along the vertical direction, and the composite reflecting mirror 3 can be horizontally divided by means of the unit reflecting surface 31.

The following describes functions and effects of the vehicle signal lighting unit 1 according to the present invention having the above-mentioned configurations. In the present invention, the light source 2 is provided at a specified position and the hood member 5 is also used, thereby preventing direct light from emitting from the light source toward the outer lens 4. This structure allows the vehicle signal lighting unit 1, when it is turned on, to irradiate only light reflected on the composite reflecting mirror 3.

Accordingly, when the vehicle signal lighting unit is turned on, the entire area of the outer lens 4 illuminates almost uniformly, providing a luminescent surface with more uniform luminance than that for the prior art which contains a direct light from the light source 2. Further, no contrast between light and shade occurs on the luminescent surface, improving aesthetics. When the vehicle signal lighting unit is turned off, no parts except the composite reflecting mirror 3 are actually visible through the outer lens 4, solving an aesthetic problem that a lighting unit according to the prior art exposes the light source, a socket, and the like to observers.

Furthermore, the composite reflecting mirror 3 is formed to be a composite of the unit reflecting surfaces 31 which reflect light from the light source 2 (2b, 2a) at two locations. The luminance of the reflected light at each unit reflecting surface 31 locally becomes an average of luminances for two light sources 2. Consequently, when the composite reflecting mirror 3 is considered to be a whole reflecting surface, it provides an average luminance for two light sources 2, allowing the lighting unit to illuminate uniformly.

Figure 3:
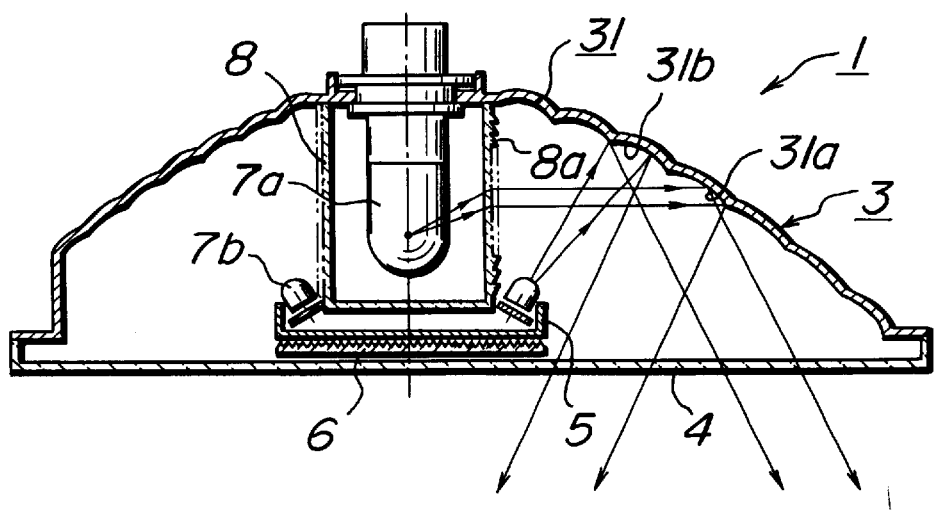
FIG. 3 is a cross-sectional view showing another embodiment of the vehicle signal lighting unit according to the present invention.

FIG. 3 shows another embodiment of the present invention. The first embodiment prevents the light source 2 from being observed by providing the light source 2 on both ends of the vehicle signal lighting unit 1 in the horizontal direction and covering the light source 2 by use of the hood member 5. The present embodiment can be applied for a tail lamp and the like. The tail lamp is so configured that a reflex reflector 6 is provided in the vicinity of the outer lens 4, that the area provided with the reflex reflector 6 is non-radiative area and that the rear of the reflex reflector is invisible.

Therefore, the light source is not exposed to direct observation even if the light source is provided at the rear of said reflex reflector 6. This embodiment utilizes a light source 7a by means of a filament lamp and a light source 7b by means of an LED at the rear of the reflex reflector 6. The light source 7a using the filament lamp employs an inner lens 8 provided with a proper prism cut 8a for preventing the light source 7a from irradiating direct light through the outer lens 4.

Moreover, the composite reflecting mirror 3 is formed to be a composite structure of the unit reflecting surface 31 which reflects light from two directions, namely from the light source 7a by means of the filament lamp and from the light source 7b by means of LED. This structure provides functions and effects equivalent to those for the previous embodiment. Depending on needs, a hood member 5 for preventing the light source 7a, 7b, and the like from being observed directly may be provided.

Figure 4:
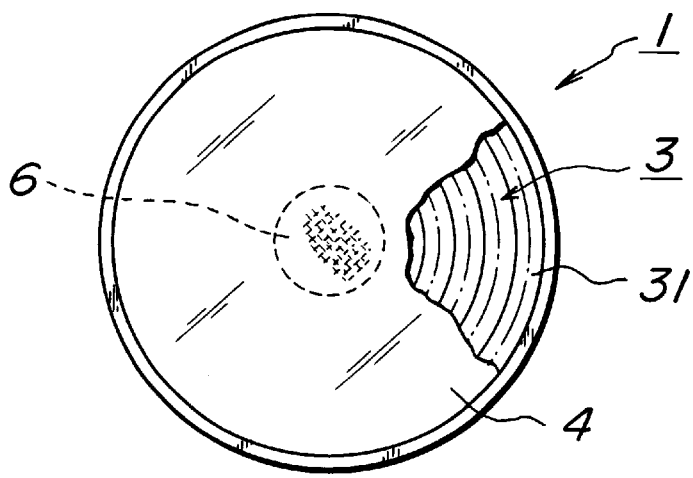
FIG. 4 is an explanatory drawing showing a front shape of another embodiment.
Figure 5:
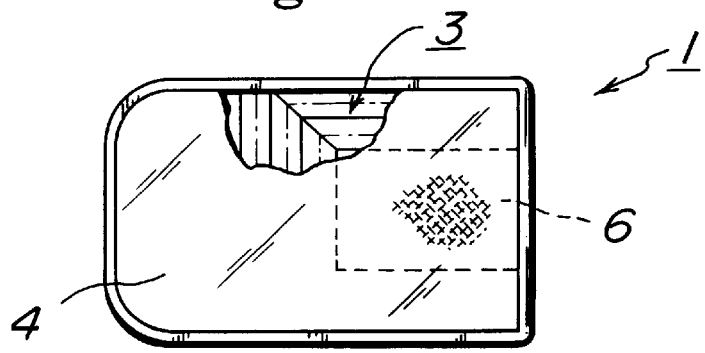
FIG. 5 is an explanatory drawing showing another front shape of another embodiment.

Still further, since in this embodiment light sources 7a and 7b are arranged within a non-radiative area within the outer lens 4, component members, when viewed from the front of the outer lens 4, can be arranged in various forms. For example, the reflex reflector 6 can be placed at the center of the outer lens in the form of a circle (see FIG. 4), oval or polygon (no figure provided). As another example, one side of the reflex reflector 6 can touch an outer periphery of the outer lens 4 (see FIG. 5).

Figure 6:
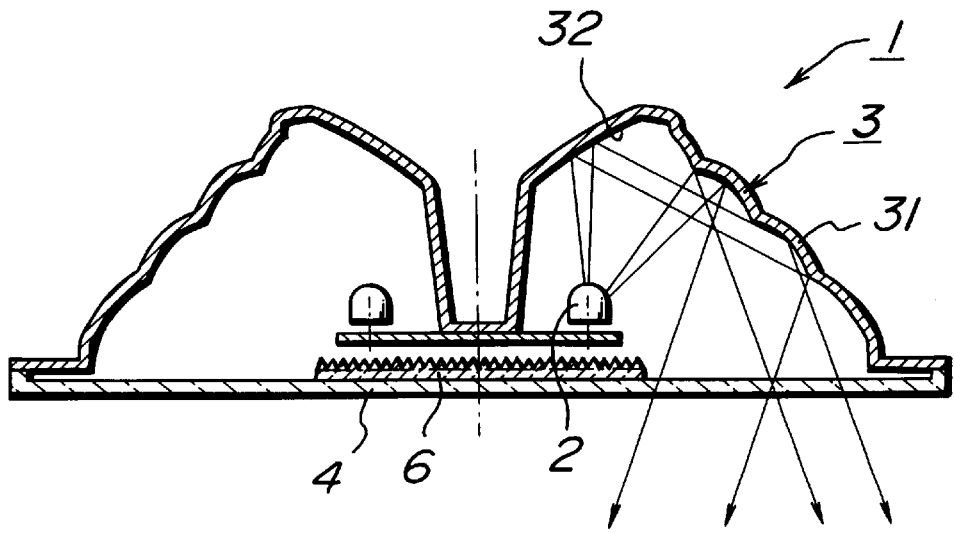
FIG. 6 is a cross-sectional view showing yet another embodiment of the vehicle signal lighting unit according to the present invention.
Figure 7:
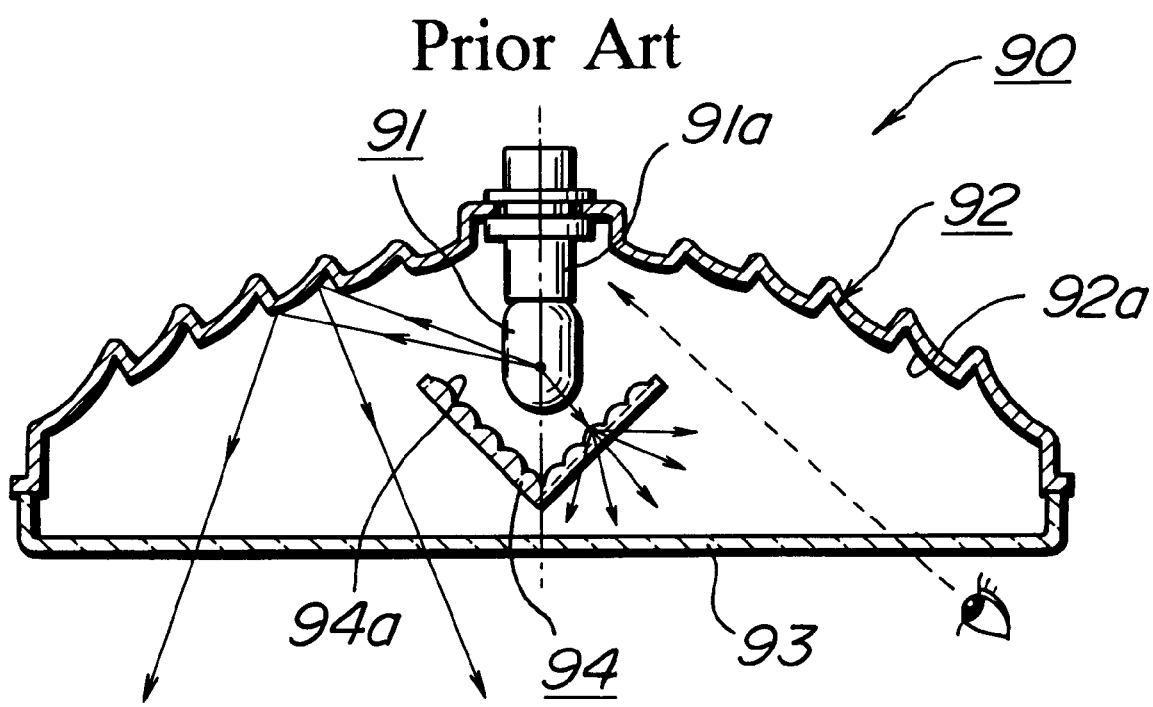
FIG. 7 is a cross-sectional view showing an example according to the prior art.

FIG. 6 shows yet another embodiment of the present invention. In the previous embodiments light sources are utilized at two locations for generating incident light against the composite reflecting mirror 3 from two directions. In this embodiment, the composite reflecting mirror 3 is provided with a return reflecting surface 32 in addition to the unit reflecting surface 31. This provides for light from two directions, that is, light that directly reaches the unit reflecting surface 31 from the light source 2 and light that reflects against the return reflecting surface 32 and then reaches the unit reflecting surface 31.

As explained above, the present invention allows the vehicle signal lighting unit, when turned on, to emit only light reflected on the composite reflecting mirror and provides more uniform luminance than that of a lighting unit according to the prior art which also emits direct light from the light source. When the vehicle signal lighting unit is turned off, the present invention prohibits internal components such as the light source from being observed from outside and allows for a simplified design. This gives a greatly advantageous effect on aesthetic improvements for vehicle signal lighting units of a similar type.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A vehicle signal lighting unit for providing light in an illuminating direction, said vehicle signal lighting unit comprising:

at least one light source having an optical access;

an outer lens; and a composite reflecting mirror including unit reflecting surfaces which reflect light having desired light distribution characteristics from said light source toward said outer lens; wherein:

said light source is disposed so that said light source does not emit direct light in said illuminating direction of said vehicle signal lighting unit, so that said light source provides incident light to said composite reflecting mirror from at least two directions, and prevents direct observation of said light source through said outer lens, and so that said optical axis of said light source is aimed towards said composite reflecting mirror; and wherein each unit reflecting surface of said composite reflecting mirror comprises reflecting surfaces which reflect light received from said light source in said two directions; and said light source is further disposed so that when said incident light is reflected from said reflecting mirror, said outer lens is substantially uniformly illuminated.

2. A vehicle signal lighting unit according to claim 1, wherein said light source is provided outside an effective luminescent surface of said vehicle signal lighting unit.

3. A vehicle signal lighting unit according to claim 1, wherein said light source is provided at two ends of said lighting unit.

4. A vehicle signal lighting unit according to claim 2, wherein said light source is provided at two ends of said lighting unit.

5. A vehicle signal lighting unit according to claim 1, wherein a hood is disposed between said outer lens and said light source, said hood inhibiting observation of said light source through said outer lens.

6. A vehicle signal lighting unit according to claim 2, wherein a hood is disposed between said outer lens and said light source, said hood inhibiting observation of said light source through said outer lens.

7. A vehicle signal lighting unit according to claim 3, wherein a hood is disposed said outer lens and said light source, said hood inhibiting observation of said light source through said outer lens.

8. A vehicle signal lighting unit according to claim 4, wherein a hood is disposed between said outer lens and said light source, said hood inhibiting observation of said light source through said outer lens.

9. A vehicle signal lighting unit according to claim 1, wherein a reflex reflector is provided proximate to said outer lens, and a rear of said reflex reflector is disposed in front of said light source.

10. A vehicle signal lighting unit according to claim 2, wherein a reflex reflector is provided proximate to said outer lens, and a rear of said reflex reflector is disposed in front of said light source.

11. A vehicle signal light unit according to claim 1, wherein said light source comprises at least two sources of light, spaced apart from each other and each having a respective said optical axis toward said mirror.

12. A vehicle signal light unit according to claim 11, wherein said light sources are oriented so that their respective optical axes are directed toward each other.

* * * * *